July 18, 1939.                B. DICK                 2,166,754
                          BRAKING APPARATUS
                          Filed May 4, 1938           2 Sheets-Sheet 1
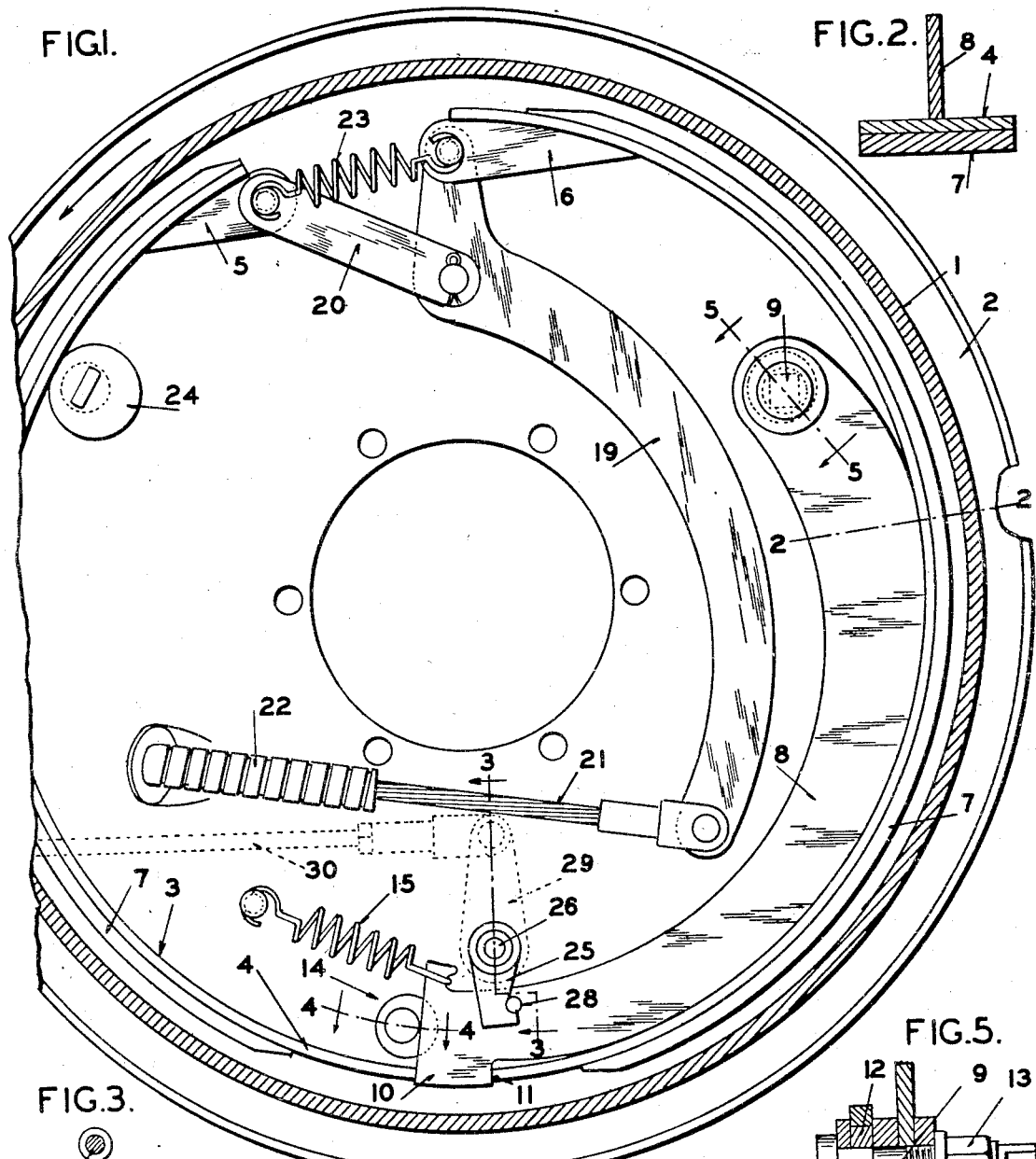
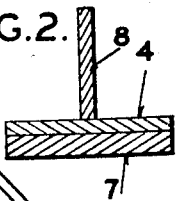
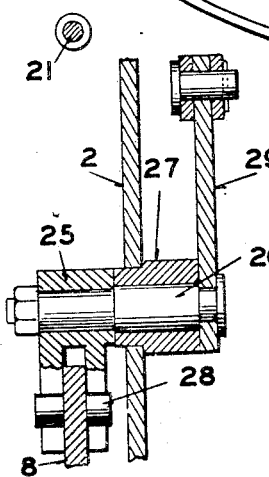
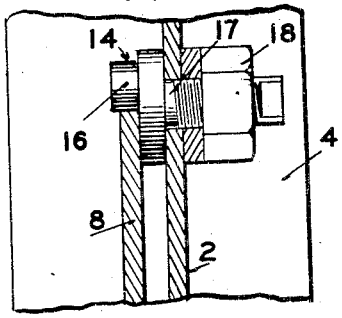
INVENTOR.
BURNS DICK
BY
ATTORNEY.

July 18, 1939.　　　　　B. DICK　　　　　2,166,754
BRAKING APPARATUS
Filed May 4, 1938　　　　2 Sheets-Sheet 2
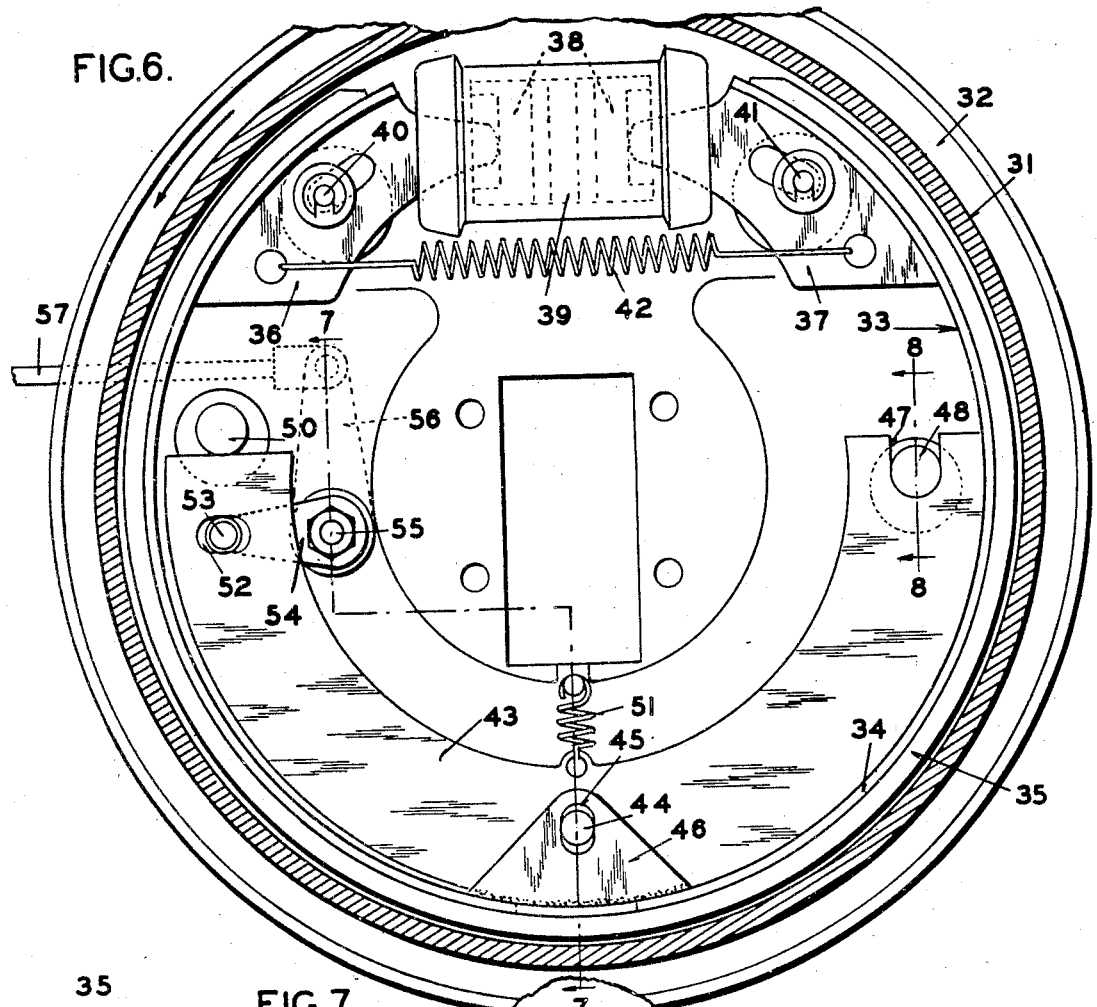
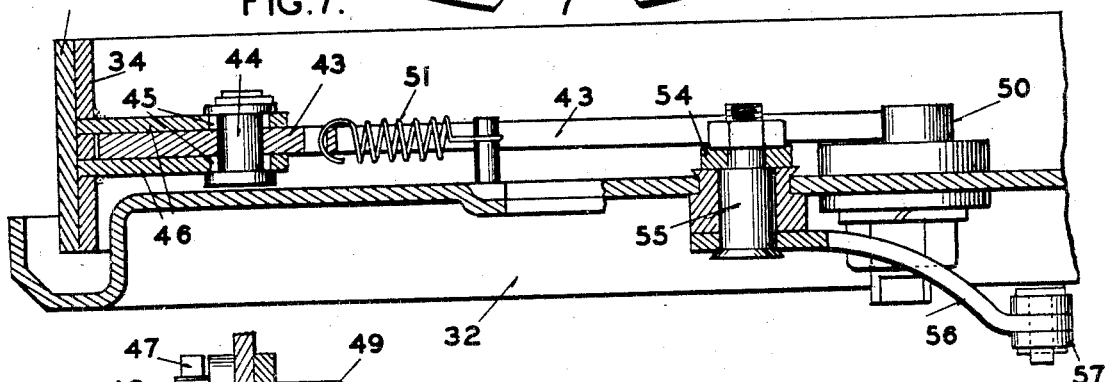
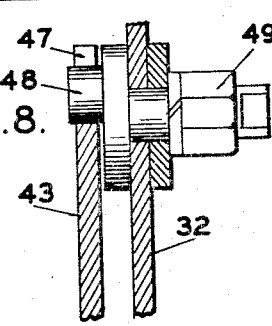
INVENTOR.
BURNS DICK
BY
ATTORNEY.

Patented July 18, 1939

2,166,754

UNITED STATES PATENT OFFICE 2,166,754

BRAKING APPARATUS

Burns Dick, Ferguson, Mo., assignor to Wagner Electric Corporation, St. Louis, Mo., a corporation of Delaware Application May 4, 1938, Serial No. 205,893

15 Claims. (Cl. 188—78)

My invention relates to braking apparatus and more particularly to a band brake of the type shown by the patent to Steve Schnell, No. 2,017,635, issued October 15, 1935.

One of the objects of my invention is to produce a band brake having associated therewith a pressure applying lever and which will be simple in construction, efficient in operation, and which can be manufactured at a very low cost.

Another object of my invention is to produce a brake of the type referred to that will have substantially the same braking characteristics in both directions of rotation of the drum.

Still another object of my invention is to so embody an auxiliary brake actuating means in the type of brake referred to that the pressure applying lever only will be actuated thereby to apply the brake.

Other objects of my invention will become apparent from the following description taken in connection with the accompanying drawings showing two embodiments. In the drawings Figure 1 is a side view, partly in section, of a brake embodying my invention; Figures 2, 3, 4 and 5 are various cross-sectional views of portions of the brake, said views being taken on the lines 2—2, 3—3, 4—4 and 5—5, respectively, of Figure 1; Figure 6 is a cross-sectional view, partly in section, of a modification; and Figures 7 and 8 are cross-sectional views taken on the lines 7—7 and 8—8, respectively, of Figure 6.

Referring to Figures 1 to 5, inclusive, in detail, the numeral 1 indicates the brake drum and 2 the usual backing plate secured to some fixed part of the vehicle. Within the drum is a substantially 360 degree brake band 3 capable of being expanded at its adjacent ends for engagement with the drum. As shown in Figure 2, the band is formed from a single rectangular strip 4 of steel or other suitable material and is of a uniform thickness throughout. The ends have welded or otherwise secured thereto brackets 5 and 6 to facilitate the attachment of the expanding means. Friction material 7 is secured to the outer surface of the band to provide a lining therefor for cooperation with the adjacent inner surface of the drum.

An arcuate-shaped lever 8 is pivotally mounted at its upper end to the backing plate by means of a pin 9 and is connected at its lower end to the central portion of the band by means of a projection 10 snugly fitting in a slot 11 in the strip 4. The end portion of pin 9 upon which the lever is pivoted carries an eccentric bearing 12 for adjusting the end of the lever with respect to the band, the pin 9 being held in adjusted position by means of a nut 13 cooperating with the threaded outer end of the pin. The lever 8 is formed from a single strip of metal and the radius curvature of the outer arcuate surface which freely engages the strip 4 of the band is the same as the radius of curvature of the strip. An adjustable eccentric stop 14 is carried by the backing plate adjacent the lower end of lever 8 and this end of the lever is normally held in abutting engagement with this stop by means of a spring 15. The adjustable stop, as seen in Figure 4, comprises an eccentric portion 16 on the inner end of a bolt 17 which is clamped to the backing plate by means of a nut 18.

The expanding means for the ends of the brake band comprises a lever 19 pivotally mounted on bracket 6 and a link 20 pivotally connected to the lever and the other bracket 5 on the end of the band. The lever 19 is actuated by means of a cable 21 connected to its lower end and adapted to be operated from some remote point through suitable mechanism as is the usual practice. There is also shown a sheath 22 for enclosing the cable. The band is normally held in retracted position out of engagement with the drum by means of a spring 23 connected to the adjacent ends. There is also provided an adjustable eccentric stop 24 for determining the "off" position of one end of the band, the "off" position of the other end of the band being determined by the adjusted position of anchor pin 9.

In addition to the actuating lever 19 and link 20, I provide an auxiliary actuating mechanism which may be employed for operating the brake when desired, as for example, to hold the brakes applied when the vehicle upon which the brake is mounted is parked. This auxiliary actuating means, as best seen in Figure 3, comprises an arm 25 secured to a shaft 26 mounted in a suitable bearing 27 carried by the backing plate. The arm 25 is forked to extend on opposite sides of lever 8 to abut the ends of a pin 28 carried by the lower end of the lever. The outer end of shaft 26 has secured thereto a lever 29 for rotating shaft 26 and operating lever 25. A cable or rod 30 is connected to the upper end of lever 26 whereby the lever may be controlled from a remote point, as for example, the operator's compartment of the vehicle.

In operation, when the drum in rotating in the "forward" direction, as indicated by the arrow, and lever 19 is actuated by means of cable 21, the band will be expanded and initially engaged with the drum and will have a slight circumferential movement with the drum. This will cause the band to apply pressure to the end of lever 8 since this lever is connected to strip 4 by projection 10. The lever 8 will thus be swung in an anti-clockwise direction about pivot pin 9 and thereby apply radial pressure to the rear portion of the band, which pressure will be distributed over the entire arc of contact between the lever and strip 4. The thickness of the metal strip 4 which forms the band is great enough, depending upon the material used, to prevent the forward portion from buckling.

When the drum is rotating in the direction opposite that indicated by the arrow and lever 19 is actuated, the band will be expanded into engagement with the drum and since the lower end of the lever is free to abut against stop 14, the band will anchor against this stop. Under these conditions, the band will have the same characteristics as an ordinary band which is anchored at its center.

When it is desired to operate the auxiliary brake actuating mechanism, cable 30 is pulled toward the left, thus causing lever 25 to apply pressure to the lower end of lever 8 through pin 28. This will swing the lever toward the drum and cause the band to be applied to the drum to produce a braking action, which action, however, will not be as great as that produced when lever 19 is actuated since the portion of the band acted upon by lever 8 is the only portion which has pressure applied thereto. When the drum is rotating in the direction indicated by the arrow, the wrapping action of the band will also bring the forward section of the band into engagement with the drum and there will be a limited amount of braking torque produced by this forward section even though no pressure is being applied to the end thereof.

From the foregoing it is readily seen that I have produced a brake which is simple in construction and which can be manufactured at a very low cost. The brake band can be made from a single strip of metal of uniform thickness and lever 8 can be made by a punching operation. The connection between lever 8 and strip 4 only requires the formation of projection 10 on the lower end of lever 8 and the cutting away of a portion of strip 4 to form the receiving slot. The actuating mechanism consisting of lever 19 and link 20 is also cheaply manufactured and the attachment of these members to the ends of the band requires only the securing of brackets 5 and 6 to the ends of strip 4 which may be done by welding.

Referring to the form of brake shown in Figures 6, 7 and 8, there is disclosed the usual brake drum 31 and backing plate 32 and positioned within the brake drum is the brake band 33 comprising a strip 34 of uniform thickness and carrying the lining 35. The ends of the brake band are provided with brackets 36 and 37 for cooperation with the pistons 38 of the fluid motor 39 whereby the brake may be expanded into engagement with the drum in a well-known manner. A combined guide and stop 40 cooperates with bracket 36 and a combined guide and stop 41 cooperates with bracket 37 and the ends of the band are normally held against these stops by retracting spring 42.

An arcuate-shaped lever 43 cooperates with the band and extends over substantially 180 degrees of the brake band. Its central part is connected to the central part of the band by means of a pin 44 which is positioned in slightly oversize holes 45 in two brackets 46 welded to the band and positioned on opposite sides of the lever. One end of the lever is formed with a notch 47 for receiving an adjustable eccentric stop 48 carried by the backing plate, the stop being secured in adjusted position to the backing plate by means of a nut 49 (Figure 8). The other end of the lever has positioned adjacent thereto an adjustable eccentric stop 50 similar to stop 48 and the end surface of the lever is normally held in engagement with this stop when the band is disengaged from the drum by the spring 51 at the center of the lever.

The end portion of the lever which cooperates with stop 50 is formed with an oversized opening 52 for receiving a pin 53 on the end of arm 54 pivotally mounted on the backing plate by means of a shaft 55. This shaft is actuated by an arm 56 secured to the exterior end of the shaft and the arm is operated from a remote point by means of a pull-rod 57.

When the drum is rotating in the normal forward direction, as indicated by the arrow, and the fluid motor 39 is actuated, the band will be expanded into engagement with the drum. This will cause the band to have slight circumferential movement with the drum and as a result thereof the arcuate lever 43 will be swung in an anti-clockwise direction about pivot 48 due to the connection of the lever with the central part of the band, thus causing the lever to apply pressure to the drum. Since the outer edge of lever 43 has the same radius of curvature as strip 34 of the band with which it engages, the pressure applied to the band by the lever will act on substantially 180 degrees of the band.

When the drum is rotated in the opposite direction and the fluid motor is operated, lever 43 will abut against stop 50 and be rotated in a clockwise direction about this abutment due to the connection between the lever and the band. Under these conditions the arcuate lever 43 will apply pressure to the band over that portion of the band which is contracted by the lever. All of the lever will not be able to engage the band and apply a radial pressure thereto since the slot 47 cooperating with abutment 48 will not permit the lever to shift bodily in the direction of a chord drawn between its ends and thus permit the portion of the lever between the stop 50 and the connection at the central part of the band to engage with the band. Sufficient braking torque, however, will be present to accomplish efficient braking of a vehicle when it is moving backward.

If it is desired to apply the band to the drum by the auxiliary applying means, rod 57 is moved to the left, thus causing arm 54 to apply pressure to the end of the lever. If the drum is rotating in the direction indicated by the arrow, the lever will abut the stop 48 and the entire lower half of the band will be forced into engagement with the drum by a radial pressure acting on the entire arc which is contacted by the lever. If the drum is rotating in the opposite direction when the auxiliary actuating means is operated, the central part of the band will be forced into engagement with the drum and then the lever will be carried with the band until the lever engages stop 50. The torque output of the brake when the auxiliary applying means is operated and when the drum is rotating in the direction indicated by the arrow will be greater than that when the drum is operated in the opposite direction, since the lever can apply pressure over a greater arc under the first named conditions.

Being aware of the possibility of other modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking apparatus, the combination of a support, a brake drum, a substantially 360 degree brake band adapted to have its ends expanded to engage it with the drum, actuating means for said ends, said band being of a rectangular cross section and of a uniform thickness throughout the major portion of its length, and a lever pivoted to the support adjacent one end of the band and connected to the band at a point intermediate the pivot and the other end of the band, said lever being capable of applying radial pressure to the band over a substantial arc thereof when the ends are actuated.

2. In braking apparatus, the combination of a support, a brake drum, a substantially 360 degree brake band adapted to have its ends expanded to engage it with the drum, actuating means for said ends, a lever pivoted to the support adjacent one end of the band and connected to the band at a point intermediate the pivot and the other end of the band, said lever being capable of applying radial pressure to the band over a substantial arc thereof when the ends are actuated, and auxiliary actuating means for directly engaging and actuating said lever independently of the first named actuating means to force the band into engagement with the drum.

3. In braking apparatus, the combination of a support, a brake drum, a substantially 360 degree brake band adapted to have its ends expanded to engage it with the drum, actuating means for said ends, said band being of rectangular cross section and of a uniform thickness throughout the major portion of its length, and a lever pivoted to the support adjacent one end of the band and connected to the band at a point intermediate the pivot and the other end of the band and capable of applying radial pressure to the band over a substantial arc thereof when the ends are actuated, said lever being of rectangular cross section and of uniform thickness and being positioned at right angles to the band.

4. In braking apparatus, the combination of a support, a brake drum, a substantially 360 degree brake band adapted to have its ends expanded to engage it with the drum, actuating means for said ends, said band being of rectangular cross section and of a uniform thickness throughout the major portion of its length, a lever pivoted to the support adjacent one end of the band and connected to the band at a point intermediate the pivot and the other end of the band and capable of applying radial pressure to the band over a substantial arc thereof when the ends are actuated, said lever being of rectangular cross section and of uniform thickness and being positioned at right angles to the band, and auxiliary actuating means for directly engaging and actuating said lever independently of the first named actuating means to force the band into engagement with the drum.

5. In braking apparatus, the combination with a support, a brake drum, a substantially 360 degree brake band adapted to have its ends expanded into engagement with the drum, and an arcuate-shaped lever pivoted to the support adjacent one end of the band and connected to the band at a point intermediate the pivot and the other end of the band and being capable of applying radial pressure to the band over a substantial arc thereof, said connection between the lever and the band comprising a projection carried by the lever and an opening in the band for receiving the projection.

6. In braking apparatus, the combination with a support, a brake drum, a substantially 360 degree brake band adapted to have its ends expanded to engage it with the drum, actuating means for said ends, said band being of rectangular cross section and of a uniform thickness throughout the major portion of its length, and an arcuate lever pivoted to the support adjacent one end of the band and connected to the band at a point intermediate the pivot and the other end of the band and capable of applying a radial pressure to the band over a substantial arc thereof, said connection between the lever and the band comprising an integral projection on the end of the lever and an opening in the band for receiving the projection.

7. In braking apparatus, the combination with a support, a brake drum, a substantially 360 degree brake band adapted to have its ends expanded to engage it with the drum, actuating means for said ends, said band being of rectangular cross section and of a uniform thickness throughout the major portion of its length, an arcuate lever pivoted to the support adjacent one end of the band and connected to the band at a point intermediate the pivot and the other end of the band and capable of applying a radial pressure to the band over a substantial arc thereof, said connection between the lever and the band comprising an integral projection on the end of the lever and an opening in the band for receiving the projection, an arm pivoted to the support and operatively connected to the end of the lever adjacent the connection, and means for operating said arm independently of the actuating means.

8. In braking apparatus, the combination of a support, a brake drum, a substantially 360 degree brake band adapted to have its ends expanded to engage it with the drum, actuating means for said ends, an arcuate lever extending over and adapted to contact a substantial arc of the band, abutments for the ends of the lever, and means for connecting the lever to the band so that it will engage one of said abutments and apply radial pressure to a substantial arc of the band when the drum is rotating in one direction and engage the other abutment and apply radial pressure to a substantial arc of the band when the drum is rotating in the other direction.

9. In braking apparatus, the combination of a support, a brake drum, a substantially 360 degree brake band adapted to have its ends expanded to engage it with the drum, actuating means for said ends, a substantially 180 degree arcuate lever for applying a radial pressure to the band over a substantial arc thereof, means for connecting the intermediate portion of the lever to the intermediate portion of the band diametrically opposite the ends thereof, and abutments for the ends of the lever and carried by the support.

10. In braking apparatus, the combination of a support, a brake drum, a substantially 360 degree brake band adapted to have its ends expanded to engage it with the drum, actuating means for said ends, a substantially 180 degree arcuate lever for applying a radial pressure to the band over a substantial arc thereof, means for connecting the intermediate portion of the lever to the intermediate portion of the band diametrically opposite the ends thereof, abutments carried by the support for the ends of the lever, and auxiliary actuating means for actuating one end of said lever independently of the first named actuating means to force the band into engagement with the drum.

11. In braking apparatus, the combination of a support, a brake drum, a substantially 360 degree brake band adapted to have its ends expanded to engage it with the drum, actuating means for said ends, said band being of rectangular cross section and of a uniform thickness throughout the major portion of its length, a substantially 180 degree arcuate lever for applying radial pressure to the band over a substantial arc thereof, means for pivotally connecting the intermediate portion of the lever to the intermediate portion of the band diametrically opposite the ends thereof, and abutments carried by the support for the ends of the lever.

12. In braking apparatus, the combination of a support, a brake drum, a substantially 360 degree brake band adapted to engage it with the drum, actuating means for said ends, said band being of rectangular cross section and of a uniform thickness throughout the major portion of its length, a substantially 180 degree arcuate lever for applying radial pressure to the band over a substantial arc thereof, means for pivotally connecting the intermediate portion of the lever to the intermediate portion of the band diametrically opposite the ends thereof, abutments carried by the support for the ends of the lever, said abutments being adjustable, and cooperating means between one of said abutments and the lever for preventing radial movement of that end of the lever.

13. In braking apparatus, the combination of a support, a brake drum, a substantially 360 degree brake band adapted to have its ends expanded to engage it with the drum, actuating means for said ends, said band being of rectangular cross section and of a uniform thickness throughout the major portion of its length, a substantially 180 degree arcuate lever for applying radial pressure to the band over a substantial arc thereof, said lever being rectangular in cross section and positioned at right angles to the band, means for pivotally connecting the intermediate portion of the lever to the intermediate portion of the band diametrically opposite the ends thereof, and abutments carried by the support for the ends of the lever.

14. In braking apparatus, the combination of a support, a brake drum, a substantially 360 degree brake band adapted to have its ends expanded to engage it with the drum, actuating means for said ends, said band being of rectangular cross section and of a uniform thickness throughout the major portion of its length, a substantially 180 degree arcuate lever for applying radial pressure to the band over a substantial arc thereof, means for pivotally connecting the intermediate portion of the lever to the intermediate portion of the band diametrically opposite the ends thereof, abutments carried by the support for the ends of the lever, an arm pivoted to the support and cooperating with one end of the band, and means for operating the arm to cause the lever to force the band into engagement with the drum independently of the actuating means.

15. In braking apparatus, the combination of a support, a brake drum, a substantially 360 degree brake band adapted to have its ends expanded to engage it with the drum, said band being of substantially uniform rectangular cross section throughout the major portion of its length, actuating means for said ends, an arcuate lever, abutments for the ends of the lever, and means for connecting the lever to the band so that it will engage one of said abutments and apply radial pressure to a substantial arc of the band when the drum is rotating in one direction and engage the other abutment and apply radial pressure to a substantial arc of the band when the drum is rotating in the other direction.

BURNS DICK.